US009924557B2

(12) United States Patent
Rautiola et al.

(10) Patent No.: US 9,924,557 B2
(45) Date of Patent: *Mar. 20, 2018

(54) CONNECTING A CIRCUIT-SWITCHED WIRELESS ACCESS NETWORK TO AN IP MULTIMEDIA SUBSYSTEM

(71) Applicant: Intermec IP Corp., Fort Mill, SC (US)

(72) Inventors: Markku Rautiola, Tampere (FI); Heikki Oukka, Kempele (FI)

(73) Assignee: Intermec IP Corp., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/344,725

(22) Filed: Nov. 7, 2016

(65) Prior Publication Data

US 2017/0111953 A1    Apr. 20, 2017

Related U.S. Application Data

(63) Continuation of application No. 12/737,593, filed as application No. PCT/FI2007/050027 on Jan. 18, 2007, now Pat. No. 9,491,729.

(30) Foreign Application Priority Data

Jan. 19, 2006 (FI) .................................... 20060046

(51) Int. Cl.
*H04W 76/02* (2009.01)
*H04W 12/06* (2009.01)
(Continued)

(52) U.S. Cl.
CPC ....... *H04W 76/026* (2013.01); *H04L 61/1511* (2013.01); *H04L 61/3085* (2013.01);
(Continued)

(58) Field of Classification Search
CPC ... H04W 60/00; H04W 76/026; H04W 60/02; H04L 61/1511; H04L 61/6054; H04L 63/0281; H04L 63/0272
(Continued)

(56) References Cited

U.S. PATENT DOCUMENTS 7,184,418 B1    2/2007 Baba et al.
7,664,495 B1    2/2010 Bonner et al.
(Continued)

FOREIGN PATENT DOCUMENTS

WO    03001836 A1    1/2003
WO    2005039132 A1    4/2005

OTHER PUBLICATIONS

European Exam Report in related EP Application No. 07700292.1, dated Mar. 7, 2016, 3 pages (previously submitted in Parent Application).
International Search Report for application PCT/FI2007/050027, dated Apr. 26, 2007, 3 pages, (previously submitted in Parent Application).

*Primary Examiner* — Noel Beharry
*Assistant Examiner* — Pamit Kaur
(74) *Attorney, Agent, or Firm* — Additon, Higgins & Pendleton, P.A.

(57) ABSTRACT

A network device performs a delayed registration in connection with phone call setup, if the network device does not know a phone number of a user in question at the time of updating the location updating. In addition, the network device performs user authentication and creates and maintains an encrypted and secure network connection between the network device and an IP multimedia subsystem by using data security mechanisms of a terminal of the IP multimedia subsystem and the authentication and data security parameters of the terminal received from the IP multimedia subsystem.

20 Claims, 1 Drawing Sheet

(51) Int. Cl.
*H04W 60/00* (2009.01)
*H04L 29/12* (2006.01)
*H04W 60/02* (2009.01)
*H04L 29/06* (2006.01)
*H04W 88/16* (2009.01)

(52) U.S. Cl.
CPC ...... *H04L 61/6054* (2013.01); *H04L 63/0281* (2013.01); *H04L 63/083* (2013.01); *H04L 65/1006* (2013.01); *H04L 65/1016* (2013.01); *H04L 65/1043* (2013.01); *H04L 65/1073* (2013.01); *H04W 12/06* (2013.01); *H04W 60/00* (2013.01); *H04W 60/02* (2013.01); *H04L 63/0272* (2013.01); *H04L 63/08* (2013.01); *H04W 76/02* (2013.01); *H04W 88/16* (2013.01)

(58) Field of Classification Search
USPC ........................................................ 370/331
See application file for complete search history.

(56) References Cited

U.S. PATENT DOCUMENTS

| | | |
|---|---|---|
| 7,961,714 B1 | 6/2011 | Watson et al. |
| 9,491,729 B2* | 11/2016 | Rautiola ............... H04W 60/00 |
| 2003/0026245 A1 | 2/2003 | Ejazk |
| 2003/0027569 A1 | 2/2003 | Ejzak |
| 2003/0027595 A1 | 2/2003 | Ejzak |
| 2004/0264439 A1 | 12/2004 | Doherty et al. |
| 2006/0077965 A1 | 4/2006 | Garcia-Martin et al. |
| 2007/0016562 A1 | 1/2007 | Cooper |
| 2007/0195805 A1* | 8/2007 | Lindgren ............ H04L 65/1016 370/401 |
| 2008/0247385 A1 | 10/2008 | Witzel et al. |
| 2009/0190579 A1 | 7/2009 | Witzel et al. |
| 2011/0019665 A1 | 1/2011 | Le Rouzic et al. |
| 2011/0188446 A1* | 8/2011 | Bienas .................. H04W 74/00 370/328 |

* cited by examiner

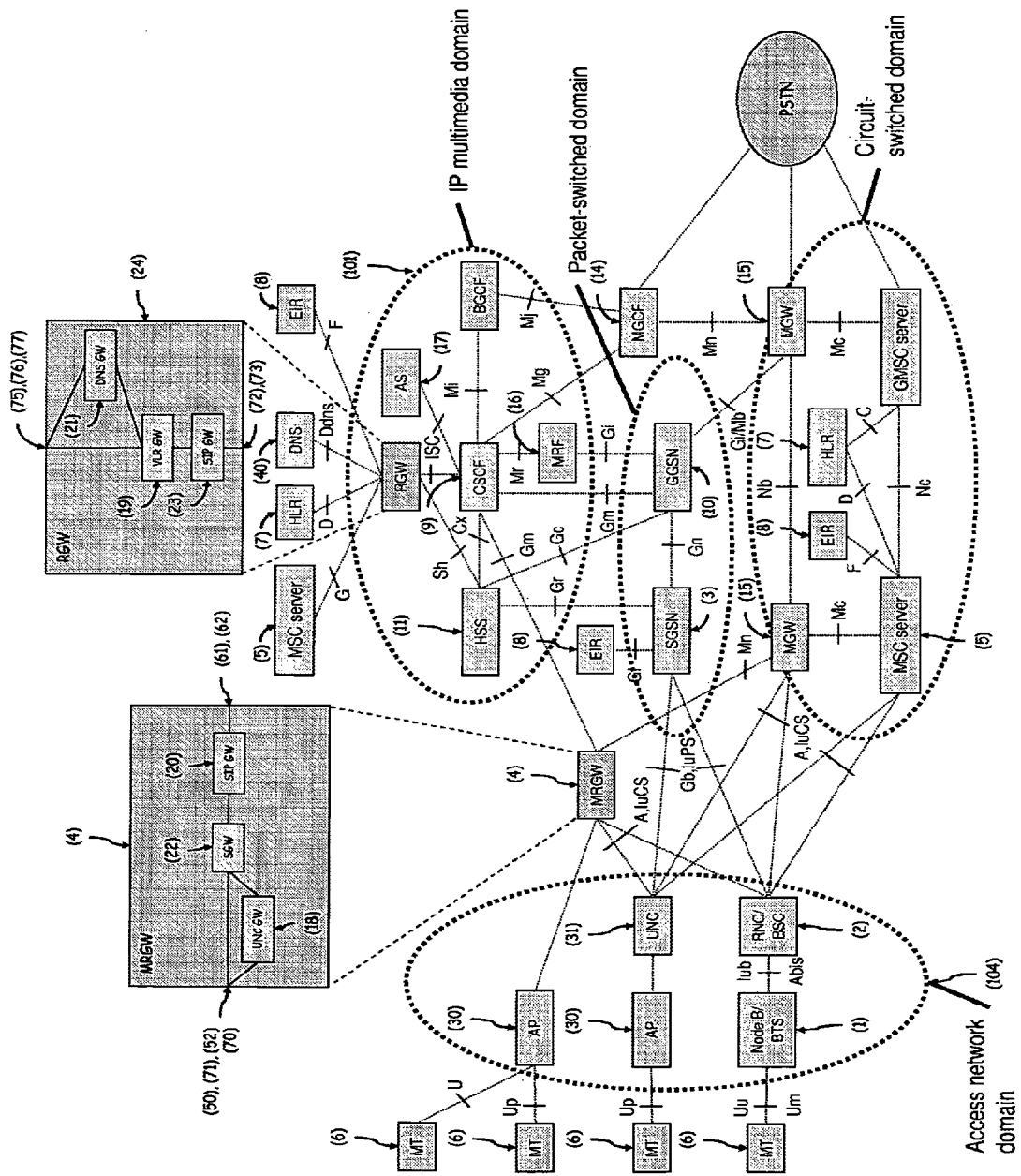

CONNECTING A CIRCUIT-SWITCHED WIRELESS ACCESS NETWORK TO AN IP MULTIMEDIA SUBSYSTEM

CROSS-REFERENCE TO RELATED APPLICATIONS

The present application claims the benefit of U.S. patent application Ser. No. 12/737,593 for Connecting a Circuit-Switched Wireless Access Network to an IP Multimedia Subsystem filed Jan. 28, 2011 (and published Nov. 10, 2011 as U.S. Patent Publication No. 2011/0274034), now U.S. Pat. No. 9,491,729, which is the National Stage of International Application No. PCT/FI2007/050027 for Connecting a Circuit-Switched Wireless Access Network to an IP Multimedia Subsystem filed Jan. 18, 2007, which designated the United States of America, and which International Application was published WIPO Publication No. WO2007/085692 A1, which claims the benefit of Finish Application No. 20060046 filed Jan. 19, 2006. Each of the foregoing patent applications, publications, and patent is hereby incorporated by reference in its entirety.

The aspects of the disclosed embodiments relate to a system and a method for connecting a wireless radio access network directly to an IP Multimedia Subsystem (IMS) specified by 3GPP (the $3^{rd}$ Generation Partnership Project) with a multi-radio protocol gateway (MRGW) according to the disclosed embodiments.

BACKGROUND

As the wireless access network it is possible to use radio networks of public mobile phone systems, such as, for example, GSM, IS-54, IS-95, CDMA-2000 and WCDMA radio networks, as well as radio networks using unlicensed radio frequencies, such as, for example, a wireless local area network in its different forms (for example different versions of IEEE 802.11) and Bluetooth networks. The access networks can be used in both a circuit-switched mode (radio networks of public mobile phone systems) and a packet-switched mode (radio networks using unlicensed radio frequencies) for circuit-switched services (reference: UMA). UMA (Unlicensed Mobile Access) refers to a manner specified by the UMA consortium for relaying the circuit-switched signaling protocols of a public mobile phone system over a TCP/IP connection by utilizing, for example, any unlicensed radio frequency. The IP multimedia subsystem is a public mobile core network specified by 3GPP, with which multimedia services are produced to end users with wireless terminals compatible with the IP multimedia subsystem. The services of the IP multimedia subsystem are based on combinations of sound, images, data and text and they are used over a packet-switched transmission path and connection.

A central service of the IP multimedia subsystem will be an IP telephone service, which will implement, and possibly in the future also replace, conventional circuit-switched telephone services (i.e. teleservices) as well as supplementary services connected to them (i.e. call transfer, call holding/call pickup, etc.) in public mobile phone networks. However, a General Packet Radio Service (GPRS) in public mobile phone networks is not necessarily the best possible or the most cost-effective way to relay information requiring real-time, such as audio and video, over a wireless access network. In a core network a packet-switched transfer method based on data network protocols of prior art is a useful and cost-effective way to relay information requiring real-time, but for a wireless access network this is not the case, not necessarily even in access networks using unlicensed radio frequencies, when large numbers of users are involved. The packed-switched transfer method in wireless access networks of public mobile phone systems is designed especially for transferring narrow-band audio and video and it is the only audio in a wireless manner when large numbers of users are involved. This issue is discussed in 3GPP as well, where specification work for roaming packet-switched bearer services and IP multimedia subsystem session has been started.

Publications US 2003/0027569 A1, US 2003/0027595 A1 and US 2003/0026245 A1 disclose a system and a new entity (iMSC), by means of which the circuit-switched services of a public mobile core network can be implemented in the IP Multimedia Subsystem (IMS) specified by the 3GPP ($3^{rd}$ Generation Partnership Project). The publications disclose a new entity called iMSC, which converts the circuit-switched location updating and the voice service and feature control into SIP operations according to an IP multimedia subsystem. The publications do not directly describe how the conversion is performed, but they refer to known operation modes of a public mobile phone network and to the known operations of the elements of a public mobile phone system.

For example, the publications disclose that the iMSC performs registration of the user equipment (UE) in the IP multimedia subsystem, but they do not disclose which public user identity the iMSC registers in the IP multimedia subsystem for the user's terminal nor which address said public user identity is connected to by means of the address connection being registered. In accordance with the recommendations of the IP multimedia subsystem of 3GPP—to which the publications refer—there may be several registered public user identities and they may be in the form of a SIP resource identifier (SIP URI, Uniform Resource Identifier) or a uniform resource locator meant for a telephone number.

The above-mentioned public user identities are stored in an IP-multimedia-subsystem-specific subscriber identity module (SIM) card. If no public user identities are specified, one public user identity is derived according to the 3GPP recommendations from the International Mobile Subscriber Identity (IMSI) of the user, which is then registered in the IP multimedia subsystem. IMSI specifies the subscriber connection unambiguously, but IMSI is not a telephone number with which or to which it is possible to call from a conventional mobile phone or telephone network, and not necessarily even within the IP multimedia subsystem. In generic IP telephony networks the spectrum of public user identities is even wider, when proprietary systems, such as Skype, are also taken into account.

If now a mobile phone number is registered in the IP multimedia subsystem as the user's public address and the domain name of the iMSC as the address connection, as a person skilled in the art can assume from the operational descriptions of the publications in question and on the basis of the recommendations of 3GPP and IETF—and which is an absolute condition for the solution disclosed in the publications to even function—it still remains unclear how the address connection registered for the user is provided to the ENUM/DNS service. It is not specified in the recommendations of 3GPP or IETF either.

For the part of call control the operation of the conversion is described in FIG. 3 of the publications, where the operation of iMSC is described by two known elements 'MSC Server' and 'P-CSCF'. A person skilled in the art can on the basis of the publications assume that reference is made to elements specified in the 3GPP recommendations and their operation, in which case it remains unclear how the conversion is made, because neither of the above-mentioned elements supports the conversion of call control signaling in any way as such, and in the publications in question the way the conversion is made is not specified as a new operation for said elements. Elsewhere in the publications it is disclosed that the iMSC behaves like a combination of a SIP User Agent, (SIP UA) and 'P-CSCF'. Further, a person skilled in the art can on the basis of the publications assume that reference is made to elements specified in the 3GPP recommendations and their operation, in which case it remains unclear how, for example, the conversion of a call control signaling is made, because neither of the above-mentioned elements supports the conversion of call control signaling in any way as such according to the 3GPP recommendations, and in the publications in question the way the conversion is made is not specified as a new operation for said elements.

For the part of call control signaling a more operative combination would be, according to the 3GPP recommendations and imitating the publications in question, for example a combination of 'MSCServer'-'T-SGW'-'MGCF'-'B-CSCF' or 'MSC Server'-'T-SGW'-'MGCF'. The same applies for the conversion of circuit-switched supplementary services. For the part of SIP registration the above-mentioned combination of the SIP user agent and 'P-CSCF' would be more operative from the point of view of the SIP connection procedure, if the interface between iMSC and the 'C-CSCF' entity mentioned in the publications would, in accordance with the 3GPP recommendations, be Gm. The interface between iMSC and the 'C-CSCF' entity is now specified by a new interface 'Mx'. In the publications the interface is specified as an interface using the SIP connection procedure according to the procedures of the IP multimedia subsystem, there are no other specifications for it and in the 3GPP recommendations the interface in question does not exist. In addition, the SIP user agent and 'P-CSCF' do not as such support the conversion of the location updating signaling in any way according to the 3GPP recommendations.

Further, in connection with the location updating of the mobile phone network and registration to the IP multimedia subsystem, FIG. 4 of the publications shows that the location updating to the mobile phone network is performed first and then the registration to the IP multimedia subsystem. This may lead to an unfortunate situation for the user: if the location updating to the mobile phone network is now successful, but registration to the IP multimedia subsystem fails, the result is a situation where no calls can be made with the terminal in question and no calls are received in it, because the user in question has not registered to a core network, i.e. the IP multimedia subsystem. The situation cannot be rectified until the terminal performs a periodic location updating or the user switches the terminal off and on again, in which case the registration to the IP multimedia subsystem is attempted again. In paragraph [0059] of the publication US 2003/0026245 A1, is mentioned the procedure 'inter-iMSC Location Update' of the 3GPP recommendation TS 24.008, which, however, is not specified in the recommendation in question, nor is, for example, the 'inter-MSC Location Update' procedure. The same procedure is mentioned in the other above-listed publications as well.

The publication mentions the iMSC entity performs the authentication of the user, for example paragraphs [0057] and [0059] of US 2003/0026245 A1, which on the basis of the description in the publication is an authentication based specifically on the procedures of a conventional mobile phone network, i.e. authentication performed by the visitor location register VLR on the basis of authentication parameters received from the home location register HLR over the MAP interface, and not an authentication performed by an IP multimedia subsystem. This assumption is also supported by the description of the operation in paragraph [0098] of US 200370026245 A1 (which description of operation can be found in the other publications as well): iMSC entity sends an SIP registration request to the 'CSCF' (first to 'I-CSCF', which sends the request further to 'S-CSCF'), after which the 'CSCF's should perform authentication of the terminal through the iMSC entity by using the SIP authentication procedure of the IP multimedia subsystem and only then bring the SIP registration to a finish with 'HSS'.

SUMMARY

The disclosed embodiments make it possible to combine two cost-effective ways that have be proven usable in practice for implementing voice services in public mobile phone systems, i.e. a circuit-switched transmission path in a wireless access network and a packed-switched transmission path and service implementation in a service network. The disclosed embodiments make it possible for mobile phone service providers to implement an IP multimedia subsystem and to implement voice services for those hundreds of millions of users with, for example, ordinary GSM phones. The mobile phone service providers can develop the market with a new core network technique without them having to invest in the additional capacity of a wireless access network and without having to wait for new multifunction terminals to come to the market.

BRIEF DESCRIPTION OF THE DRAWING

FIG. 1 shows an operational block diagram of an overall system utilizing the disclosed embodiments.

DETAILED DESCRIPTION

The more specific structure and operation of the overall system utilizing the disclosed embodiments is described with terms, interfaces and protocols known from GSM and UMTS.

In the overall system according to FIG. 1 a circuit-switched wireless access network (104) of a public mobile phone system is connected to an IP multimedia subsystem (101) via a multi-radio protocol gateway (4) according to the disclosed embodiments. The circuit-switched wireless access network is formed by a base station (1) as well as a base station/radio network controller (2), which is called a Base Station Subsystem (BSS) in the GSM system and a Radio Network System (RNS) in the third generation UMTS system. The wireless access network (104) can also be formed by, for example, an UMA network utilizing unlicensed frequencies, which network contains wireless radio access points (AP) (30) as well as an UMA network controller (31), or it can be formed of a generic access network utilizing unlicensed frequencies, which is composed of wireless access points (30). A mobile services switching center/visitor location register server (MSC Server) (5), a home location register (HLR) (7), an equipment identity register (EIR) (8), service and gateway nodes (SGSN and GGSN) (3) and (10) of a packet radio network, as well as an IP multimedia subsystem (101), in turn, form the mobile core network. The mobile core network is divided into a circuit-switched part, which comprises the MSC Server (5) (this may naturally also be a conventional combination of a mobile services switching center and a visitor location register), a packet-switched part, which comprises service and gateway nodes (3) and (10) of a packet radio network, a location register part, which comprises the home location register (7), the visitor location register (not shown separately in FIG. 1) and the packet radio network service and gateway nodes (3) and (10), as well as an IP multimedia subsystem (101), which includes a Home Subscriber Server (HSS) (11), a Call Session Control Function (CSCF) (9) in its different functional forms (i.e. I-CSCF, P-CSCF, S-CSCF and B-CSCF), an Application Server (AS) (17), a Media Gateway Control Function (MGCF) (14), a Media Gateway (MGW) (15), as well as a Multimedia Resource Function (MRF) (16). The register gateway (RGW) according to the disclosed embodiments functions as an application server of the IP multimedia subsystem (101).

In the following the interfaces of the multi-radio protocol gateway according to the disclosed embodiments of FIG. 1 will be described more in detail.

When the wireless access network (104) of the public mobile phone system of FIG. 1 is connected via an interface A (50) or IuCS (71) to a multi-radio protocol gateway (4), the wireless access network (104) sees the multi-radio protocol gateway (1) and the IP multimedia subsystem (101) behind it as an MSC Server (5) of the public mobile phone system, i.e. as a circuit-switched part of the public mobile core network. It should be noted that, for example, the interface (50) can be either a real GSM A interface, or it can be a distributed A interface in such a manner that the lower protocols of the A interface (for example, MTP and SCCP protocols) are implemented with an SS7oIP gateway utilizing the known 'SS7 over IP' gateway technique (not shown in FIG. 1) and the upper protocols of the A interface (for example BSSMAP and DTAP protocols) in the multi-radio protocol gateway (4), which also supports the above-mentioned 'SS7 over IP' gateway technique. If the base station/radio network controller (2) of the wireless access network (104) also supports the above-mentioned 'SS7 over IP' gateway technique, said SS7oIP gateway is not needed in the interfaces A (50) and IuCS (71). Said 'SS7 over IP' gateway technique is a method specified by IETF, including protocols (i.e. Sigtran protocols), for transferring SS7 signaling by utilizing the IP connection protocol. Via the interface Up (52) the terminal (6) sees the multi-radio protocol gateway (4) and the IP multimedia subsystem (101) behind it as an UMA network controller and as an MSC Server (5) of a public mobile phone system, i.e. as a circuit-switched part of the public mobile core network. Via the interface U (70) the terminal (6) sees the multi-radio protocol gateway (4) and the IP multimedia subsystem (101) behind it as an MSC Server (5) of a public mobile phone system over a TCP/IP (or the like) connection when the terminal (6) performs location updating to a public mobile phone system. It is to be noted that in this case the terminal (6) must have adequate properties to activate and perform the location updating procedure to the mobile phone system over, for example, the above-mentioned TCP/IP (or the like) connection.

Via the interface Gm (61) of FIG. 1 the session control function (9) of the IP multimedia subsystem (101) sees the multi-radio protocol gateway (4) as User Equipment (UE) of the IP multimedia subsystem (101), i.e. as a terminal (6) that is compatible with the IP multimedia subsystem (101), which normally communicates with the session control function (9) of the IP multimedia subsystem via the packed radio network gateway node (10). Via the interface ISC (72) the session control function (9) sees the register gateway (24) as an application server (17) of the IP multimedia subsystem (101). Via the interface Sh (73) the home subscriber server (11) sees the register gateway (24) as an application server (17) of the IP multimedia subsystem (101) as well. Via the interface Mn (62) the media gateway (15) sees the multi-radio protocol gateway (4) as a media gateway control function (14).

Via the interface D (75) of FIG. 1 the home location register (7) of the public mobile phone system sees the register gateway (24) and the IP multimedia subsystem (101) behind it as the visitor location register of the public mobile phone system when the terminal (6) performs location updating when transferring from the area of one visitor location register to another, or when a call from the public mobile phone system is relayed to the terminal (6), or when the terminal (6) requests a call relay to a public mobile phone network, or when subscriber data is changed and the changed data is transferred between the home location register (7) and the register gateway (4) and the IP multimedia subsystem (101) behind it. Via the interface G (76) the MSC Server (5) of the public mobile phone system sees the register gateway (24) and the IP multimedia subsystem (101) behind it as a visitor location register of a public mobile phone system when the terminal (6) performs location updating when transferring from one visitor location register to another. Via the interface F (77) the equipment identity register (8) of the public mobile phone system sees the register gateway (24) and the IP multimedia subsystem (101) behind it as an MSC Server (5) of the public mobile phone system when the equipment identity register (8) checks the equipment identity (IMEI) of the terminal (6). Via the interface Ddns (78) the domain name service (DNS) (40) sees the register gateway (24) as a client using the domain name service (40).

The multi-radio protocol gateway (4) according to the disclosed embodiments comprises the following functions. A UNC GW function (18) comprises an UMA radio resource protocol gateway, via which the terminal (6) equipped with UMA properties registers and communicates with the multi-radio protocol gateway (4) and through that with the IP multimedia subsystem (101). The multi-radio protocol gateway (4) does not implement the actual UMA network controller, but therefore only the UMA radio resource protocol gateway. A SIP GW function (20) comprises a SIP gateway, which implements the functions of the user equipment according to SIP specifications of 3GPP, as well as the control of user identification data and the addresses-of-record of the IP multimedia subsystem (101) and the address bindings connected to sessions. A SGW function (22) is the core of the protocol routing function of the multi-radio protocol gateway (4). The SGW function (22) receives and relays further the location updating, registering, identification, connection, disconnection requests and responses coming from and going to different interfaces.

The register gateway (24) according to the disclosed embodiments comprises the following functions. A VLR GW function (19) comprises a visitor location register protocol gateway. A SIP GW function (23) comprises a SIP gateway, which implements the user equipment functions according to the SIP specifications of 3GPP. The functions of the visitor location register according to the public mobile phone system can now be implemented as a combination of SGW (22) and SIP GW (20) functions of the multi-radio protocol gateway, as well as VLR GW (19) and SIP GW (23) functions of the register gateway system (101). A DNS GW function (4) comprises the client functions of the domain name service (4) according to IETF specifications extended with the updating procedure of the domain name service according to IETF specifications.

In the following, the function of the multi-radio protocol gateway according to the disclosed embodiments in connection with registering to the IP multimedia subsystem is described more in detail. The description of the function is based on the functions according to the 3GPP and IETF specifications.

When the SGW function (22) shown in FIG. 1 receives a location updating request from the terminal (6) via the interface A (50), IuCS (71), Up (52) or U (70), the SGW function (22) activates the SIP GW function (20) to perform the registration according to the SIP session procedure of 3GPP to the IP multimedia subsystem (101) via the interface Gm (61). The SIP GW function (20) sets the home network registrar's domain name to the Request URI (Uniform Resource Identifier) of the SIP registration request, which domain name the SIP GW function (20) derives from the user's International Mobile Subscriber Identity (IMSI) from its country and network codes according to the 3GPP specifications. The multi-radio protocol gateway (4) receives the user's international mobile subscriber identity from the terminal (6) in the location updating request or the multi-radio protocol gateway (4) requests the terminal (6) to send it in an identity message, if the user's international mobile subscribed identity does not come with the location updating request. In the To header field of the SIP registration request the SIP GW function (20) sets the registration address, which is the public user identity of the registering user presented in the form of a uniform resource locator (URL) meant for a phone number, which in this case is the international mobile phone number (mobile station ISDN, MSISDN) of the above-mentioned registering user, when the multi-radio protocol gateway (4) knows the international mobile phone number of the user in question. If the multi-radio protocol gateway (4) does not know the international mobile phone number of the user in question, the SIP GW function (20) immediately sends a location updating response indicating acceptance to the terminal (6) via the SGW function (22) without performing a registration to the IP multimedia subsystem (101). In this case the registration to the IP multimedia subsystem (101) is performed in connection with the first phone call. In the From header field of the SIP registration request the SIP GW function (20) sets the address connection connected to the SIP session services of the user's SIP end point, which address connection follows the resource identifier structure according to the SIP session procedure, including, for example, the user's international mobile phone number as a character string+':' character+'MSISDN' character string+'@' character+domain name of the multi-radio protocol gateway (4) or its numeric IP address. In the Contact header field of the SIP registration request the SIP GW function (20) relays to the IP multimedia subsystem (101) the address connection connected to the SIP session services of the user's SIP end point, which address connection the SIP GW function (20) also stores in its database (or a corresponding memory). The above-mentioned address connection of the session services of the SIP end point is the same as the address connection relayed in the From header field, i.e. the user's international mobile phone number as a character string+':' character+'MSISDN' character string+'@' character+domain name of the multi-radio protocol gateway (4) or its numeric IP address. In the Username field of the Authorization header field the SIP GW function (20) sets the private user identity of the user, which the SIP GW function (20) derives from the user's international mobile subscriber identity from its country and network codes according to the 3GPP specifications. In the Realm field of the Authorization header field the SIP GW function (20) sets an identifier of that network where the user identification is performed. The network identifier in question is the home network registrar's domain name. In the Request URI field of the Authorization header field the SIP GW function (20) sets the request URI of the SIP registration request. In the Security-Client header field the SIP GW function (20) relays to the session control function (9) of the IP multimedia subsystem (101) those data security mechanisms, which the terminal (6) supports and which are used between the terminal (6) and the session control function (9). In this case the function differs from the mechanisms specified by 3GPP in that the data security mechanisms in question are used between the multi-radio protocol gateway (4) and the session control function (9) of the IP multimedia subsystem (101), and between the terminal (6) and the multi-radio protocol gateway (4) are used the data security mechanisms of a circuit-switched wireless access network of a public mobile phone system. The ciphering procedure used between the multi-radio protocol gateway (4) and the session control function (9) is IPsec-3GPP and the integrity algorithm being used is according to either HMAC-MD5-96 or HMAC-SHA-1-96 3GPP specifications. In addition to these the multi-radio protocol gateway (4) relays in the other fields of the Security-Client header field the necessary parameters for creating a secure and encrypted security association between the multi-radio protocol gateway (4) and the IP multimedia subsystem (101), i.e. the Security Parameter Index (SPI) and the communication port numbers being used. In addition, the SIP session request includes a message body for session description, to which the SIP GW function (20) connects the data from the original location updating request: the target location area, the identity of the serving cell, the type of the location updating, the International Mobile Subscriber Identity (IMSI), the Temporary Mobile Subscriber Identity (TMSI), the previous location area, as well as the Ciphering Key Sequence Number (CKSN). It is to be noted that the data to be connected vary a little depending on whether the terminal (6) has a second or third generation SIM card. The above-presented data relate to a second generation SIM-card. As the type of the message body for description is specified an application and as the name of the application, for example, RGW. These are set in the Content-Type header field. The data from the original location updating request is relayed each in their own parameter, for example in the following manner: OperationCode=location updating, InvokeID=subscriber identity (i.e. temporary subscriber identity, international subscriber identity or some other identity unambiguously identifying the subscriber), TargetLocationAreaID=target location area, ServingCellID=identity of the serving cell, LocationUpdateType=type of the location updating, IMSI=international mobile subscriber identity, TMSI=temporary mobile subscriber identity, PreviousLocationAreald=previous location area, and CKSN=ciphering key sequence number. After receiving the registration request the session control function (9) of the IP multimedia subsystem (101) starts the authentication of the user of the terminal (6) (i.e. the subscriber connection) by sending an unauthorized response to the multi-radio protocol gateway (4). In the WWW-Authenticate header field of the unauthorized response the session control function (9) relays a random number (RAND), an authentication token (AUTN) and the authentication algorithm to be used. In the Security- Server header field of the unauthorized response the session control function (9) relays the parameters of the ciphering procedure used between the multi-radio protocol gateway (4) and the session control function (9), such as the ciphering algorithm being used, the security parameter index and the communication port numbers being used. After receiving the unauthorized response the SIP GW function (20) sends a corresponding circuit-switched connection authentication request to the terminal (6) via the SGW function (22). In the authentication request the SIP GW function (20) relays a random number and an authentication token to the terminal (6) as well as identifies the authentication algorithm to be used. After receiving the authentication request the terminal (6) picks the Message Authentication Code (MAC) and the Sequence Number (SQN) from the authentication token, calculates the Expected MAC, compares it to the authentication code of the received message and checks that the sequence number is within allowed limits. If the results are positive, the terminal (6) calculates the authentication challenge response (RES) and sends the authentication challenge response to the multi-radio protocol gateway (4) in its authentication request response. After receiving the authentication request response the SIP GW function (20) stores the user authentication etc. data in a database (or a corresponding memory), creates an Integrity Key (IK) and security parameter index, as well as a secure and encrypted network connection and sends a new SIP registration request to the session control function (9) of the IP multimedia subsystem (101) over the secure and encrypted network connection, which is formed between the multi-radio protocol gateway (4) and the session control function (9). The SIP GW function (20) adds the private user identity and authentication challenge response to the Authorization header field. The content of the Security-Client header field is the same as in the first SIP registration request. The SIP GW function (20) also adds the Security-Verify header field to the new SIP registration request in question, which contains the contents of the Security-Server header field received in the unauthorized response in an unchanged form. The new SIP registration request contains the same message body for description as the first SIP registration request. After receiving the second SIP registration request authenticating the user the session control function (9) finishes the registration with the subscribers home subscriber server (11) and relays the SIP registration request further to the SIP GW function (23) of the register gateway (24) according to the filter information received from the home subscriber server (11). After receiving the SIP registration request the SIP GW function (23) picks the data of the original location updating request from the request, creates a corresponding location updating request and relays it to the VLR GW function (19). After receiving the location updating request the VLR GW function (19) opens a connection to the previous visitor location register via the interface G (76) and sends the international subscriber identity and the authentication parameter request message to the previous visitor location register. The address of the previous visitor location register is derived from the previous location area. In the request message also the temporary subscriber identity is relayed to the previous visitor location register. The previous visitor location register responds to the request by sending authentication parameters and the international subscriber identity to the VLR GW function (19) in the response, which the VLR GW function (19) stores in its memory. After this the VLR GW function (19) forms a subscriber authentication request and sends it to the SIP GW function (23). In the subscriber authentication request is relayed a Random Number (RAND) and the ciphering key sequence number. After receiving the subscriber authentication request the SIP GW function (23) forms an INFO message to be sent to the session control function (9) of the IP multimedia subsystem (101). Instead of the INFO message the SIP GW function (23) can create and send a corresponding unauthorized response to the session control function to be relayed to the multi-radio protocol gateway (4) as was sent by the session control function (9) to the multi-radio protocol gateway (4) to the first SIP registration request received from the multi-radio protocol gateway (4). However, in this example INFO messages are used. In the request URI of the INFO message the SIP GW function (23) sets the domain name or the multi-radio protocol gateway or its numeric IP address. In the To header field the SIP GW function (23) sets the domain name of the same multi-radio protocol gateway (4) or its numeric IP address. In the From header field the SIP GW function (23) in turn sets the domain name of the register gateway (24) or its numeric IP address. In addition, the INFO message includes a message body for session description, to which the SIP GW function (23) connects the data from the subscriber authentication request: the random number and the ciphering key sequence number. As the type of the message body for description is specified an application and as the name for example MRGW. These are set in the Content-Type header field. The data from the subscriber authentication request are relayed each in their own parameter, for example in the following manner: OperationCode=authentication request, InvokeID=subscriber identity, RAND=random number and CKSN=ciphering key sequence number. Alternatively the SIP GW function (23) could relay the entire subscriber authentication message received from the VLR GW function (19) as such in the message body for description of the INFO message. The SIP GW function (23) sends the INFO message to the session control function (9) of the IP multimedia subsystem (101) via the interface ISC (72). The session control function (9) relays the INFO message to the multi-radio protocol gateway (4). After receiving the INFO message the SIP GW function (20) of the multi-radio protocol gateway first sends an OK response to the session control function (9) and then forms the original subscriber authentication request from the parameters of the message body for description of the INFO message and relays it to the SGW function (22), which relays it further to the terminal (6) via the interface A (50), IuCS (71) or Up (52). The terminal (6) responds to the subscriber authentication request with an authentication response, which includes a Signed Response (SRES). After receiving the authentication response the SGW function (22) relays it further to the SIP GW function (20), which forms an INFO message from it. In the request URI of the INFO message the SIP GW function (20) sets the domain name or the register gateway (24) or its numeric IP address. In the To header field the SIP GW function (20) sets the domain name of the same register gateway (24) or its numeric IP address. In the From header field the SIP GW function (20) in turn sets the domain name of the multi-radio protocol gateway (4) or its numeric IP address. In the Content-Type header field the SIP GW function (20) sets application as the type of the message body for description and RGW as the application name. As the parameters of the message body for description the SIP GW function (20) sets OperationCode=authentication response, InvokeID=subscriber identity and SRES=identity response. The SIP GW function (20) sends the INFO message to the session control function (9) of the IP multimedia subsystem (101) via the interface Gm (61). After receiving the INFO message the session control function (9) sends it to the SIP GW function (23) of the register gateway (24). After receiving the INFO message the SIP GW function (23) of the registering gateway (24) first responds with an OK response to the session control function (9) and after this forms the original authentication response from the received INFO message and relays it further to the VLR GW function (19). After receiving the authentication response the VLR GW function (19) compares the received identity response to the corresponding stored response and when they match, the user has been authenticated acceptably. When the user has been authenticated acceptably, the VLR GW function (19) sends a location updating request to the home location register (7) of the user via the interface D (75). The home location register (7) of the user responds by sending to the VLR GW function (19) the subscriber data related the circuit-switched services etc. of the public mobile phone system, which the VLR GW function (19) saves in its database (or a corresponding memory). After the home location register (7) has accepted the location updating, if the re-allocation of the temporary subscriber identity must be performed, the VLR GW function (19) forms a ciphering mode setting request and relays it to the SIP GW function (23). In the ciphering mode setting request is relayed the ciphering mode and the ciphering key to be used. After receiving the ciphering mode setting request the SIP GW function (23) forms an INFO message of it to be sent to the session control function (9) of the IP multimedia subsystem (101). In the request URI of the INFO message the SIP GW function (23) in turn sets the domain name of the multi-radio protocol gateway (4) or its numeric IP address. In the To header field the SIP GW function (23) sets the domain name of the same multi-radio protocol gateway (4) or its numeric IP address. In the From header field the SIP GW function (23) sets the domain name of the register gateway (24) or its numeric IP address. In the Content-Type header field of the INFO message an application is specified as the type of the message body for description and for example MRGW as the name of the application. The ciphering mode received in the ciphering mode setting request is relayed with the parameter of the message body for description of the INFO message, for example, in the following manner: OperationCode=ciphering mode setting request, InvokeID=subscriber identity, Ciphering Mode=ciphering mode and Kc=ciphering key. The SIP GW function (23) sends the INFO message to the session control function (9) of the IP multimedia subsystem (101) via the interface ISC (72). After receiving the INFO message the session control function (9) relays it to the SIP GW function (20) of the multi-radio protocol gateway (4). After receiving the INFO message the SIP GW function (20) of the multi-radio protocol gateway (4) first sends an OK response to the session control function (9) and then forms the original ciphering mode setting request from the parameters of the message body for description of the received INFO message and relays it further to the SGW function (22), which relays it further to the wireless access network (104) via the interface A (50), IuCS (71) or Up (72). After the ciphering code setting the VLR GW function (19) of the register gateway (24) activates the International Mobile Equipment Identity (IMEI) of the terminal (6) by relaying an identity request to the SIP GW function (23) where it states the requested identity type, which in this case is, therefore, the international mobile equipment identity. After receiving the identity request the SIP GW function (23) forms an INFO message of it, as described above, to be sent to the session control function (9) of the IP multimedia subsystem (101) via the interface ISC (72). In the Content-Type header field of the INFO message an application is specified as the type of the message body for description and, for example, MRGW as the name of the application. The identity type received in the identity request is relayed with the parameter of the message body for description of the INFO message for example in the following manner: OperationCode=identity request, InvokeID=subscriber identity and MobileIdentityType=identity type. The SIP GW function (23) sends the INFO message to the session control function (9) of the IP multimedia subsystem (101) via the interface ISC (72). After receiving the INFO message the session control function (9) sends it to the SIP GW function (20) of the multi-radio protocol gateway (4). After receiving the INFO message the SIP GW function (20) of the multi-radio protocol gateway (4) first sends an OK response to the session control function (9) and then forms the original identity request from the parameters of the message body for description of the received INFO message and relays it to the SGW function (22), which relays it further to the terminal (6) via the interface A (50), IuCS (71) or Up (52). The terminal (6) responds to the identity request with an identity response, which includes the international equipment identity. After receiving the identity response the SGW function (22) relays it further to the SIP GW function (20), which forms an INFO message from it. In the request URI of the INFO message the SIP GW function (20) sets the domain name of the register gateway (24) or its numeric IP address. In the To header field the SIP GW function (20) sets the domain name of the same register gateway (24) or its numeric IP address. In the From header field the SIP GW function (20) in turn sets the domain name of the multi-radio protocol gateway (4) or its numeric IP address. In the Content-Type header field the SIP GW function (20) sets application as the type of the message body for description and RGW as the application name. As the parameter of the message body for description the SIP GW function (20) sets OperationCode=identity response, InvokeID=subscriber identity, MobileIdentityType=identity type and IMEI=international equipment identity. The SIP GW function (20) sends the INFO message to the session control function (9) of the IP multimedia subsystem (101) via the interface Gm (61). After receiving the INFO message the session control function (9) sends it to the SIP GW function (23) of the register gateway (24). After receiving the INFO message the SIP GW function (23) of the register gateway (24) first responds with an OK response to the session control function (9) and after this forms the original identity response from the received INFO message and relays it further to the VLR GW function (19). After receiving the identity response the VLR GW function (19) requests the international equipment identity from the equipment identity register (8) via the interface F (77). The equipment identity register (8) sends to the VLR GW function (19) the international equipment identity, which the VLR GW functions (19) compares to the equipment identity received from the terminal (6) and when they match, the VLR GW function relays the location updating acceptance response to the SIP GW functions (23) including the new temporary subscriber identity and the user's international mobile phone number. After receiving the location updating acceptance response the SIP GW function (23) creates an OK response connected to the received SIP registering request, which response includes the data from the message body for description of the location updating acceptance response. As the type of the message body for description is specified an application and for example MRGW as the name. These are set in the Content-Type header field. The data from the location updating acceptance response is relayed each in their own parameter, for example in the following manner: OperationCode=location updating acceptance response, InvokeID=subscriber identity, TMSI=new temporary subscriber identity and MSISDN=international mobile phone number. The SIP GW function (23) sends the OK message to the session control function (9) of the IP multimedia subsystem (101) via the interface ISC (72). The session control function (9) relays the OK response to the multi-radio protocol gateway (4). After this the VLR GW function (19) relays the location updating acceptance response to the DNS GW function (21). After receiving the location updating acceptance response the DNS GW function (21) can update in the domain name service (40) the SIP procedure as the primary connection establishing procedure of the name of the domain name service of the user's international mobile phone number (i.e. 'SIP+E2U') and as the address of the domain name service connected to the SIP procedure (i.e. the domain name) the address connection from the Contact header field of the SIP registrations request, for example, the user's international mobile phone number as a character string+':' character+'MSISDN' character string+ '@' character+domain name of the multi-radio protocol gateway (4) or its numeric IP address, in the form of a SIP resource identity via the interface Ddns (78). As a secondary connection establishing procedure for the name of the domain name service of the user's international mobile phone number the DNS GW function (21) can set, for example, a conventional phone call setup procedure and as the address the user's international phone number in the form of a resource locator meant for a phone number. If the domain name of the user's international mobile phone number is not in the domain name service (40), the DNS GW function (21) adds the domain name of the user's international mobile phone number and the other specifications to the domain name service (40). This data can be utilized, for example, in the ENUM service. It is to be noted that it is also possible to update as the connection establishing procedure in the domain name service (40) for example, 'Skype+E2U' and as a corresponding address a Skype identity. It is also to be noted that the above-presented updating of the domain name service (40) can also be performed by the session control function (9) of the IP multimedia subsystem (101) in connection with user registration via the interface Ddns (78). Further, it is to be noted that the home subscriber server (11) can update in the domain name service (40) the SIP procedure as one secondary connection establishing procedure for the name of the domain name service of the user's international mobile phone number, and the address connection addressing the session control function (9) as the address of the domain name service connected to the SIP procedure via the interface Ddns (78) after receiving the notice related to user registration from the session control function (9) according to the 3GPP recommendations. When the SIP GW function (20) of the multi-radio protocol gateway (4) receives the OK response from the session control function (9), the registration to the IP multimedia subsystem (101) has succeeded. If the Contact header field of the received OK response now also has some other address connection than the above-mentioned registered address connection addressing the multi-radio protocol gateway (4) in question, which connection follows the resource identity structure according to the SIP session procedure including the user's international mobile phone number as a character string+':' character+'MSISDN' character string+'@' character+some domain name or a numeric IP address, i.e. the previous registration to the IP multimedia subsystem (101) via some other multi-radio protocol gateway, that other address connection can be removed by sending a registration request to the IP multimedia subsystem (101), the expiration time of which request is 0 seconds and the Contact header field now has that other address connection. When the multi-radio protocol gateway (4) receives the final OK response from the session control function (9), the SIP GW function (20) sends a location updating response indicating acceptance to the SGW function (22), which relays it to the terminal (6). If the SIP registration fails for some reason, the SIP GW function (20) rejects the location updating, which the SGW function (22) signals between the terminal (6) and the SIP GW function (20).

In the following, the functions connected to phone call establishing/cancellation are described more in detail.

When the SGW function (22) of the multi-radio protocol gateway of FIG. 1 receives a phone call establishing request from the terminal (6) via the interface A (50), IuCS (71) or Up (52), it relays the request further to the SIP GW function (20). If registration to the IP multimedia subsystem has not been done, the SIP GW function (20) now performs the registration according to the SIP session procedure to the IP multimedia subsystem (101) via the interface Gm (61) as presented above in the part of the description of registration to the IP multimedia subsystem. In this case the SIP GW function (20) receives the international phone number of the user from the phone call establishing request received from the terminal (6). When the registration to the IP multimedia subsystem (101) has been successfully performed, the SIP GW function (20) forms a SIP session request (INVITE) to be sent to the session control function (9) of the IP multimedia subsystem (101). To the request URI of the SIP session request the SIP GW function (20) sets the phone number of the user to be reached in the form of a resource locator meant for telephone numbers. The phone number of the user to be reached is received from the phone call setup request received from the terminal (6). In the To header field the SIP GW function (20) sets the public identity of the user to be reached, i.e. the registration address, which is in the form of a resource locator meant for telephone numbers and includes the phone number of the user to be reached received in the phone call establishing request. In the From header field the SIP GW function (20) sets the caller's phone number in the form of an URL meant for telephone numbers, which phone number the SIP GW function (20) receives from the phone call establishing request received from the terminal (6). In the Contact header field the SIP GW function (20) sets the address connection connected to the session services of the caller's SIP end point, to which address the SIP requests and request responses meant for the caller's public identity are to be sent and which it stored in connection with registration. The SIP session request also includes the message body for session media description. The media is described with a set of parameters, which specify, inter alia, the network type, the domain name of the caller's SIP end point, the domain name of the used media gateway, the media type, the media relay protocol, and the media coding method. The domain name of the caller's SIP end point is the domain name of the multi-radio protocol gateway (4) in question. The domain name of the media gateway (15) being used is received from the system configuration data. The media coding method is, in turn, received from the phone call establishing request received from the terminal (6). The SIP GW function (20) sends session request to the session control function (9) of the IP multimedia subsystem (101) via the interface Gm (61). After receiving the SIP session request the session control function (20) first sends a temporary response to the SIP GW function, after which it forms an SIP session between the IP multimedia subsystem (101) and the terminal (6) via the SIP GW (20) and SGW (22) functions of the multi-radio protocol gateway (4). It is to be noted that in this case between the IP multimedia subsystem (101) and the SIP GW function (20) of the multi-radio protocol gateway (4) the connection is in accordance with the SIP session procedure and between the SIP GW function (20) and the terminal (6) it is in accordance with the circuit-switched phone call setup procedure. Via the interface A (50) and IuCS (71) the SGW function (22) relays over a circuit-switched connection when the terminal (6) uses a radio network of a public mobile phone system (i.e. a real circuit-switched connection) and via the interface Up (51) the SGW function (22) relays over a TCP/IP connection of a circuit-switched connection in accordance with the UMA specification when the terminal (6) uses an UMA connection. Cancellation of the connection takes place in a corresponding manner by signaling it between the IP multimedia subsystem (101) and the terminal (6) via the SIP GW (20) and SGW (22) functions of the multi-radio protocol gateway (4).

The phone call can also be established from the IP multimedia subsystem (101) to the terminal (6).

When the SIP GW function (20) of the multi-radio protocol gateway (4) receives an SIP session request from the session control function (9) of the IP multimedia subsystem (101) via the interface Gm (61), it converts the SIP session request into a circuit-switched phone call setup request and relays it further to the SGW function (22). The phone numbers of the user to be reached and the caller, which are necessary in the phone call setup request relayed to the SGW function (22), the SIP GW function (20) now receives from the registration addresses of the To and From header fields of the SIP session request. The SIP GW function (20) receives the phone number of the user to be reached from the request resource identifier as well. The phone call setup request must also include the coding method of the media being used, which is received from the description message body of the media of the session request. After receiving the phone call setup request the SGW function (22) first performs a paging procedure, with which the terminal (6) is made to receive a phone call setup request, if the connection between the terminal (6) and the multi-radio protocol gateway (4) is not already active. When the terminal (6) has answered the page, the SGW function (22) relays the phone call setup request to the terminal (6), after which the phone call setup is signaled between the terminal (6) and the IP multimedia subsystem (101) via the SGW (22) and SIP GW (20) functions of the multi-radio protocol gateway (4). In the first session request response, where the description message body of media is allowed, the SIP GW function (20) relays, in addition to the relay protocol and coding method of the media being used, the domain name of the SIP end point of the user to be reached, as well as the domain name of the media gateway (15) being used. The domain name of the SIP end point of the user to be reached is the domain name of the multi-radio protocol gateway (4) in question. The domain name of the media gateway (15) being used is received, for example, from the system configuration data.

The invention claimed is:

1. A system for registering a terminal to an internet protocol multimedia subsystem, the system comprising:
   a terminal configured to send a registration request to an internet protocol ("IP") multimedia subsystem, said registration request identifying the terminal by a session initiation protocol ("SIP") end point that is associated with a multi-radio protocol gateway instead of a telephone number;
   a multi-radio protocol gateway configured to connect a circuit-switched wireless access network of a public mobile core network to the IP multimedia subsystem, the multi-radio protocol gateway configured to:
      set a private user identity for the terminal;
      set a home network registrar domain name for the terminal, wherein the home network registrar domain name comprises either the domain name of the multi-radio protocol gateway or a numeric IP address for the multi-radio protocol gateway; and
      establish a secure connection between the terminal and the IP multimedia subsystem; and
   a register gateway configured to:
      authenticate the terminal in the IP multimedia subsystem;
      transmit a location update request corresponding to the new registration request to the home network registrar; and
      perform a domain name service update in connection with the registering of the terminal in the IP multimedia subsystem.

2. The system of claim 1, further comprising, the register gateway configured to perform the domain name service update by performing a delayed registration procedure of the IP multimedia subsystem in connection with a telephone call setup signal from the circuit switched portion of the public mobile core network when the multi-radio protocol gateway receives said user's telephone number in connection with said telephone call setup signal.

3. The system of claim 2, wherein the register gateway is configured to perform the delayed registration procedure based on a conventional phone call setup procedure or a proprietary procedure.

4. The system of claim 1, further comprising a location register part of the public mobile phone network configured to receive the location updating request from the register gateway via a serving gateway in the multi-radio protocol gateway.

5. The system of claim 1, further comprising the multi-radio protocol gateway configured to set the private user identity by deriving the private user identity from the user's international mobile subscriber identity from its country and network codes.

6. The system of claim 1, further comprising the multi-radio protocol gateway configured to set the home registrar domain name by setting the home registrar domain name to the Request Uniform Resource Identifier of the registration request.

7. The system of claim 1, further comprising a gateway configured to receive subscriber data for the terminal for sending the location updating request to the home network registrar.

8. The system of claim 1, wherein the terminal is further configured to compare portions of an authentication token to an authentication code received in a message from the IP multimedia system prior to sending a new registration request to the IP multimedia subsystem.

9. The system of claim 1, wherein, the IP multimedia subsystem is further configured to send, via the secure connection, an unauthorized response to the multi-radio protocol gateway to start an authentication procedure.

10. The system of claim 9, wherein the authentication procedure comprises:

the IP multimedia subsystem requesting the authentication of the user of the terminal in the IP multimedia subsystem from the multi-radio protocol gateway;

the multi-radio protocol gateway requesting authentication parameters of the circuit-switched part of a public mobile core network of the terminal from the terminal;

using the authentication parameters of the circuit-switched part of a public mobile core network of the terminal as the authentication parameters of the user of the terminal in the IP multimedia subsystem, wherein the IP multimedia subsystem is connected to the multi-radio protocol gateway in accordance with a session initiation protocol session procedure, and the multi-radio protocol gateway is connected to the terminal in accordance with a circuit-switched phone call setup procedure.

11. The system of claim 1, where the registration request comprises at least one of a TO header, a FROM header, a registration address header, a contact header, an authorization header, and a security-client header.

12. A system for establishing an integrated connection between a multi-radio protocol gateway and an internet protocol ("IP") multimedia subsystem, the system comprising:

a multi-radio protocol gateway configured to:

set a private user identity for a terminal connected to the multi-radio protocol gateway;

set a home network registrar domain name for the terminal, wherein the home network registrar domain name comprises either the domain name of the multi-radio protocol gateway or a numeric IP address for the multi-radio protocol gateway; and register the terminal in the IP multimedia subsystem by creating and maintaining a secure and encrypted connection between the multi-radio protocol gateway and the IP multimedia subsystem, wherein the multi-radio protocol gateway is configured to create said secure and encrypted connection to the IP multimedia subsystem and relay, to the IP multimedia subsystem, the private user identity and the home network registrar domain name as parameters of the terminal, and wherein the multi-radio protocol gateway uses said parameters for creating and maintaining said integrated connection to the IP multimedia subsystem.

13. The system of claim 12, wherein the multi-radio protocol gateway is configured to derive the private user identity from the user's international mobile subscriber identity from its country and network codes.

14. The system of claim 12, wherein the multi-radio protocol gateway is configured to set the home registrar domain name to the Request Uniform Resource Identifier of a session initiation protocol ("SIP") registration request.

15. The system of claim 12, further comprising a register gateway configured to send a location updating request to a home network registrar.

16. The system of claim 12, further comprising a register gateway configured to perform a delayed registration procedure to the IP multimedia system.

17. The system of claim 12, wherein the multi-radio protocol gateway is further configured to receive a telephone call setup signal from a circuit switched portion of a public mobile core system.

18. The system of claim 12, where the registration request comprises at least one of a TO header, a FROM header, a registration address header, a contact header, an authorization header, and a security-client header.

19. The system of claim 12, wherein, the IP multimedia subsystem is further configured to send, via the secure connection, an unauthorized response to the multi-radio protocol gateway to start an authentication procedure.

20. The system of claim 19, wherein the authentication procedure comprises:

the IP multimedia subsystem requesting the authentication of the user of the terminal in the IP multimedia subsystem from the multi-radio protocol gateway;

the multi-radio protocol gateway requesting authentication parameters of a circuit-switched part of a public mobile core network of the terminal from the terminal;

using the authentication parameters of the circuit-switched part of a public mobile core network of the terminal as the authentication parameters of the user of the terminal in the IP multimedia subsystem, wherein the IP multimedia subsystem is connected to the multi-radio protocol gateway in accordance with a session initiation protocol session procedure, and the multi-radio protocol gateway is connected to the terminal in accordance with a circuit-switched phone call setup procedure.

* * * * *